UNITED STATES PATENT OFFICE.

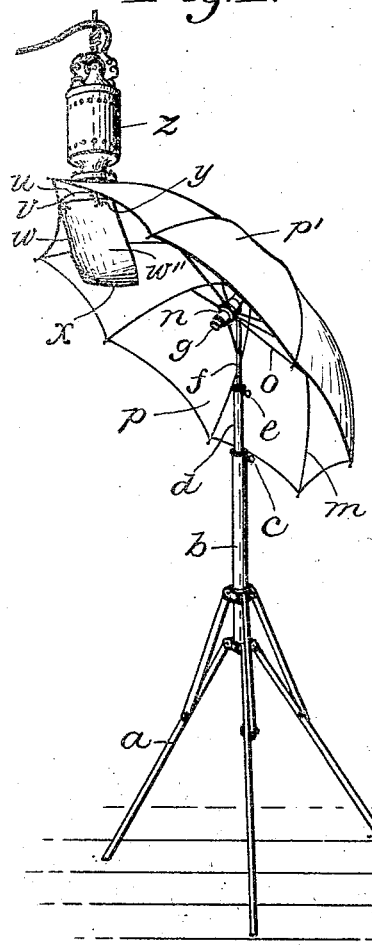
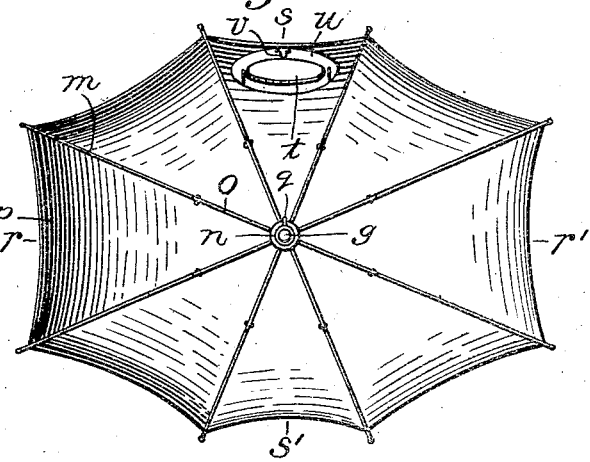
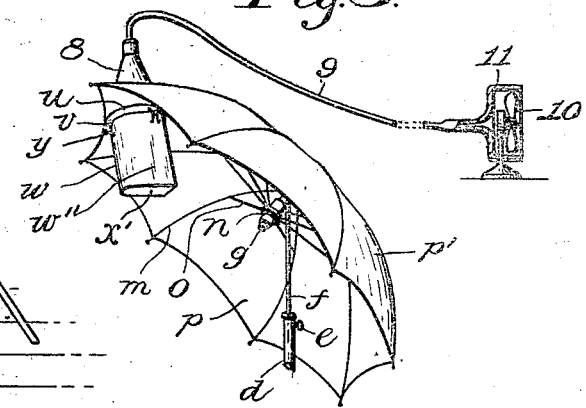
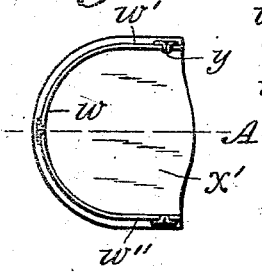
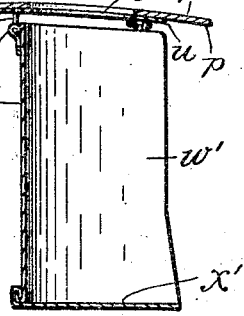
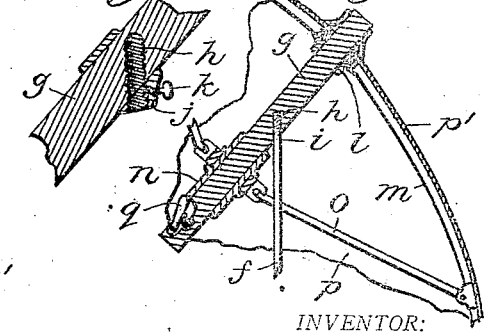

NORTH LOSEY, OF INDIANAPOLIS, INDIANA.

PHOTOGRAPHIC LIGHT-DIFFUSING APPARATUS.

No. 923,542.   Specification of Letters Patent.   Patented June 1, 1909.

Application filed December 9, 1907. Serial No. 405,791.

*To all whom it may concern:*

Be it known that I, NORTH LOSEY, a citizen of the United States, residing at Indianapolis, in the county of Marion and State of Indiana, have invented a certain new and useful Improvement in Photographic Light-Diffusing Apparatus; and I do declare the following to be a full, clear, and exact description of the invention, reference being had to the accompanying drawings, and to the characters of reference marked thereon, which form a part of this specification.

This invention relates to apparatus for reflecting and diffusing artificial light to enable photographers to obtain improved results in photographing various subjects or objects, the invention having reference particularly to apparatus whereby an electric light or other strong artificial light may be reflected and diffused onto the photographic subject without permitting direct rays of light to fall on the subject.

The objects of the invention are to provide apparatus whereby strong artificial light may be reflected and diffused onto an object to be photographed, so that the light may be softened or modified and have different character from that of direct rays of light, in order that the subject may be enveloped in the light without casting strong shadows with substantially the same results as may be obtained during daylight, an object being to provide apparatus of the above-mentioned character that may be adapted to be readily transported and used with portable photographing apparatus, particularly as an aid to commercial photographers.

The invention comprises a standard, a frame mounted on the standard and a concavo-convex reflector and diffuser mounted on the frame, and a reflector for reflecting the light onto the combined reflector and diffuser and shading the subject from the direct rays of light, the invention consisting further in a folding combined reflector and diffuser having a shading reflector connected thereto. And the invention consists further in the parts and combinations and arrangements of parts as hereinafter particularly described and defined in the claims appended hereto.

Referring to the drawings, Figure 1 is a perspective view of the photographic light diffusing apparatus; Fig. 2, an inverted plan view of the combined reflector and diffuser; Fig. 3, a perspective view of the combined reflector and diffuser having the shading reflector connected thereto and provided with means for carrying away the smoke and fumes resulting from flash lights; Fig. 4, a top plan view of the shading reflector; Fig. 5, a vertical sectional view of the shading reflector on the line A in Fig. 4, and connected to a portion of the combined reflector and diffuser; Fig. 6, a fragmentary sectional view of the stem of the frame of the apparatus; and, Fig. 7, a fragmentary central sectional view of the combined reflector and diffuser and its frame.

Similar reference characters in the several figures of the drawings designate corresponding elements or features of construction.

In a practical embodiment of the invention, a suitable base is provided which preferably is in the form of a tripod having legs $a$ and a hollow standard $b$, provided with a set-screw $c$, a hollow standard section $d$ telescoping into the standard $b$ and provided with a set-screw $e$, another standard section $f$ telescoping into the section $d$, the latter being secured by the set-screw $c$, the tripod preferably being constructed so as to be folded as is customary, and the standard being extensible or contractible, as will be apparent. A frame stem $g$ has a socket $h$ therein approximately at the middle of its length, the socket extending into the side of the stem obliquely and is preferably screw-threaded and receives the upper end $i$ of the section $f$, the upper end being preferably screw-threaded, and in some cases as shown in Fig. 6, a socket extension $j$ may be applied to the stem and be provided with a set screw $k$ for securing the stem $g$ to the section $f$ of the standard. A collar $l$ is suitably secured to the upper end of the stem $g$ and has a suitable number of frame ribs $m$ pivoted thereto so that they may swing downwardly against the stem $g$. A runner $n$ is mounted on the stem $g$ and has a suitable number of braces $o$ pivoted thereto and extending severally to the several ribs $m$ to which they are pivoted. A web is spread upon the ribs $m$ and attached thereto so as to form the necessary surface of a combined reflector and diffuser, the reflecting side $p$ of the web being concave and suitably whitened as by means of paint but is not glossed, the outer convex side $p'$ preferably being of dark color. The web is composed of any suitable fabric that may be folded and painted successfully. The stem $g$ is provided with a latch $q$ to hold the runner $n$ when moved toward the collar $l$, so as to spread the web, and when the runner is released from the latch $q$, the runner may be moved off of the lower end of the stem $g$ to fold the web. The web in plan is preferably substantially oval, so as to be greater in diameter in a horizontal direction as from $r$ to $r'$ than vertically as from $s$ to $s'$ in Fig. 2, a suitable number of the ribs $m$ being longer than others to support the web in its greater diameter. The oval form gives desirable results in reflecting the light to the best advantage for photographing purposes. It will be observed, especially by reference to Fig. 1, that the combined reflector and diffuser stands at an inclined angle, so as to reflect the light downwardly onto a subject, and by reason of the concavity of its reflecting surface, the light may be reflected in an approximately horizontal direction and also toward both sides of the subject, both directly and crosswise, the reflecting surface not being polished or bright but having dull finish of surface, diffuses the light without focusing it. The upper portion of the web has an aperture $t$ therein near its edge around which is a protecting ring $u$ preferably composed of asbestos or similar material, to which is attached a suitable number of eyes $v$. A shading reflector comprises a concavo-convex back $w$ and sides $w'$ and $w''$, and a curved bottom $x$ as in Fig. 1, or having a flat bottom $x'$ as in Fig. 3, the reflector being provided with a suitable number of hooks $y$ at the top thereof adapted to be connected to the eyes $v$, and a suitable electric lamp $z$ may be hung above the opening $t$ when the apparatus is used in a photographic studio, and the lamp may be lowered by any suitable means through the opening $t$ into the shading reflector, and the latter will concentrate and reflect the light against the concave side $p$ of the combined reflector and diffuser while preventing the direct light from falling on the subject which will be opposite the side $p$. The shading reflector may of course be made so as to be folded if desired, and when desired to use flash lights therein, it preferably has the flat bottom $x'$ on which to produce the light, either by exploding suitable powder or by means of a lamp. When chemicals are employed in producing a flash light and smoke and fumes result, a hood 8 is provided which is to be placed above the opening $t$ and has a flexible tube 9. A suction fan 10 may be provided having a case 11 to which the tube 9 is to be connected, so that the fan will draw away and expel the fumes, it being preferable to place the fan at an opening in the wall of the building in which the operations may be performed.

It is to be understood that various materials may be employed in construction of the apparatus, and if desired the shading reflector may be suitably supported independently of the combined reflector and diffuser opposite the under side $p$ thereof, so as to be near the position indicated in Figs. 1 and 2. It will be observed that some of the features are constructed somewhat similar to a wagon umbrella, which in some cases may be a convenient form of construction, but the invention is not limited to such specific construction.

In practical use, as will be apparent, the apparatus may be readily folded for transportation or unfolded and set up for use. The combined reflector and diffuser may suitably be adjusted so as to be slightly higher than the photographic camera, and may stand near the camera without interfering with the range of vision while the object is arranged opposite to the concave side $p$ and shaded by the back $w$ of the shading reflector. When the light is produced in the shading reflector, the back and sides and the bottom thereof together concentrate and reflect the light only against the reflecting side $p$ of the combined reflector and diffuser, so that the subject need not be exposed to the direct rays of light, the light being reflected in a subdued degree and effectually diffused over the subject, as will be apparent, the improved result being due partially to the various angles of the different portions of the web between the frame ribs $m$ whereby the light is reflected at many different angles. The results also will be better obtained if the ribs and other portions of the frame-work opposite to the side $p$ be coated with white paint. The standard of course may be moved more or less as may be required to throw the light properly upon the subject.

Having thus described the invention, what is claimed as new is—

1. Photographic light apparatus including a stem, a plurality of ribs mounted on the stem, an oval reflector and diffuser mounted on the ribs and having an aperture in an edge portion thereof, braces extending from the stem to the ribs, and a shading reflector to be connected to the reflector and diffuser at the aperture therein.

2. Photographic light apparatus including two reflectors, both having concave surfaces that are disposed oppositely one to the other, one of the reflectors being a shading reflector and the other one a diffusing reflector to reflect light from the shading reflector beyond the shading reflector and around the farther side thereof, means for adjustably supporting the diffusing reflector, and means for supporting the shading reflector in relatively close relation to the diffusing reflector.

3. Photographic light apparatus including a standard, an oblique-angled light reflector and diffuser mounted on the standard and having an aperture in an upper portion thereof, a shading reflector connected to the reflector and diffuser, means for producing artificial light in the shading reflector, a suction fan, a hood arranged above the reflector and diffuser at the aperture therein, and a conduit between the hood and the fan.

4. Photographic light apparatus including a stem, a plurality of ribs mounted on the stem, a reflector and diffuser mounted on the ribs and provided with means for supporting a shading reflector, braces extending from the stem to the ribs, a shading reflector having means to be connected to the supporting means, and means for supporting the stem and indirectly supporting also the shading reflector.

5. Photographic light apparatus comprising a standard, a stem removably connected to the standard, a reflector and diffuser having a concave surface and mounted on the stem to fold thereon and having an aperture in an edge portion thereof, connecting devices attached to the reflector and diffuser at the aperture, a shading reflector having a concave surface disposed oppositely to the concave surface of the reflector and diffuser, and means detachably connecting the shading reflector with the connecting devices.

In testimony whereof, I affix my signature in presence of two witnesses.

NORTH LOSEY.

Witnesses:
WM. H. PAYNE,
E. T. SILVIUS.